Aug. 25, 1970   J. B. THOMPSON   3,525,593
FLUID REACTOR
Filed Nov. 8, 1967   2 Sheets-Sheet 1
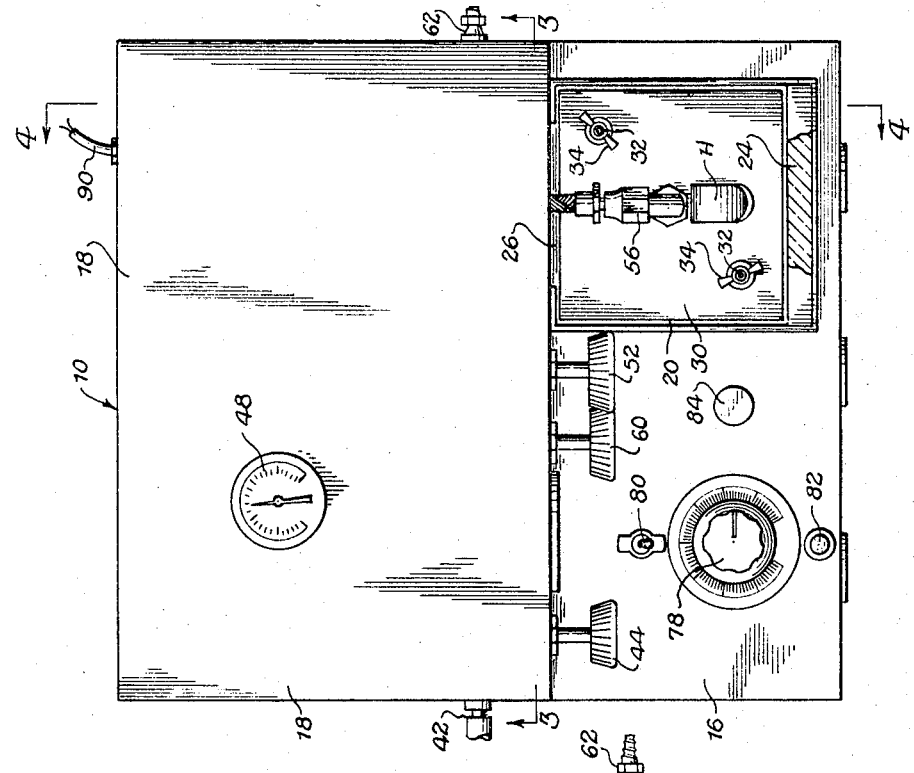
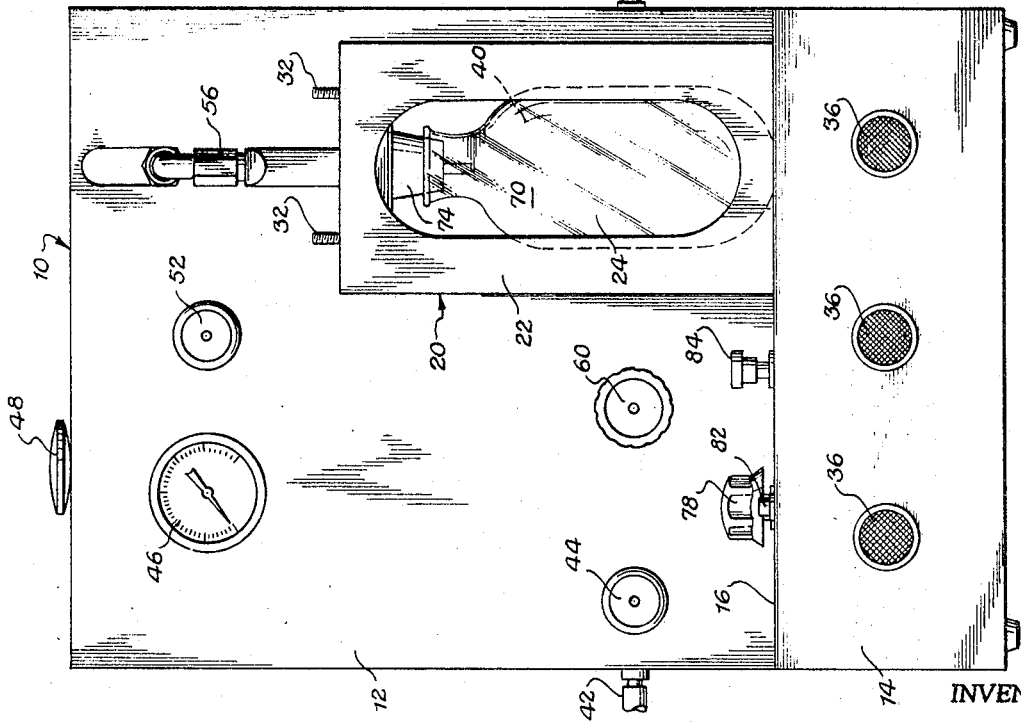
INVENTOR
Jerome B. Thompson
BY Stephens, Huettig and O'Connel
ATTORNEY

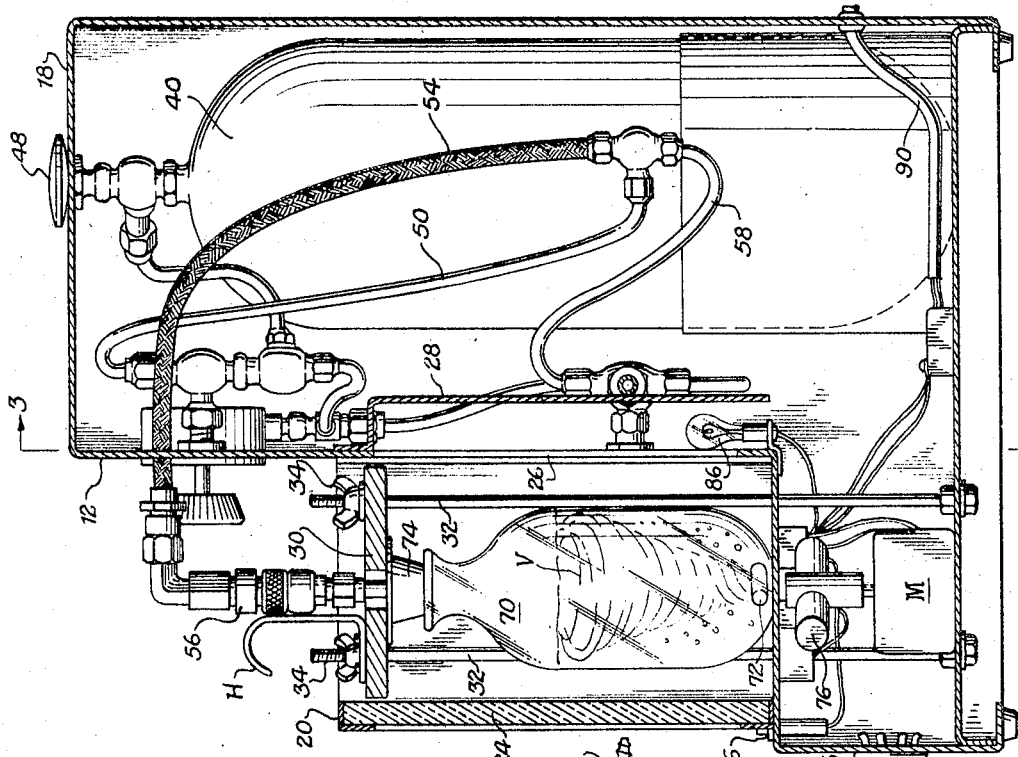
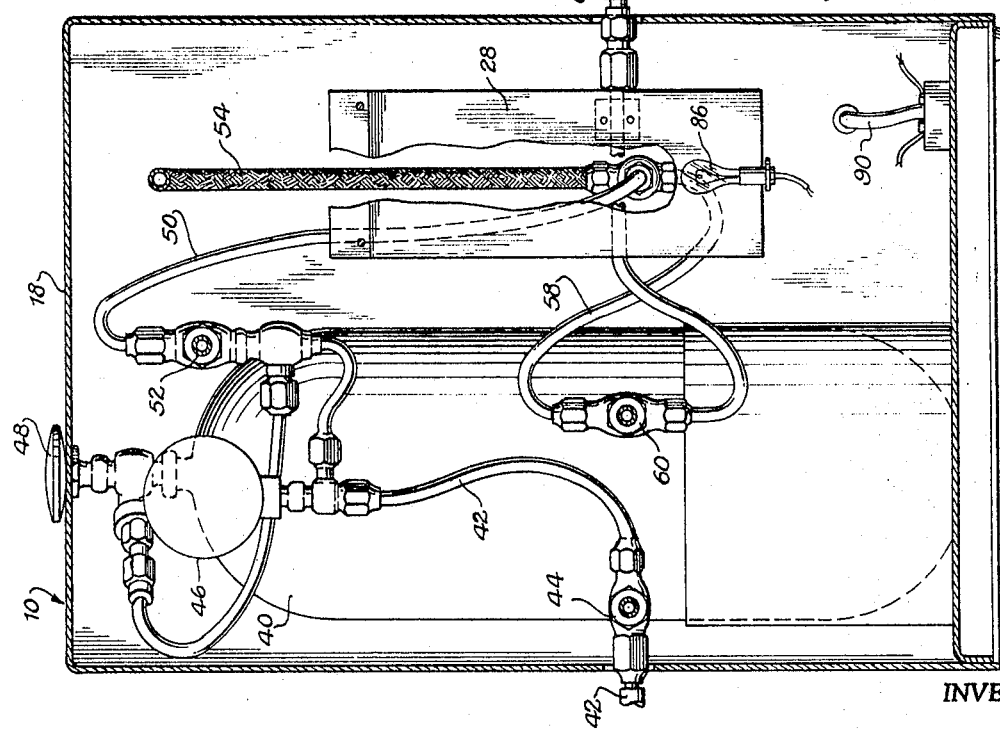

United States Patent Office 3,525,593
Patented Aug. 25, 1970

3,525,593
FLUID REACTOR
Jerome B. Thompson, Box 231, Rte. 3,
Cumberland, Md. 21502
Filed Nov. 8, 1967, Ser. No. 681,357
Int. Cl. B01l 1/00
U.S. Cl. 23—259          7 Claims

ABSTRACT OF THE DISCLOSURE

An apparatus for the mixture of fluids, as, for example, a hydrogenator, is composed of a transparent bottle having a magnetic stirring rod therein. The bottle is enclosed by a protective housing having a window through which the stirring of the fluids can be observed. Vents in the housing permit the relief of explosive pressure waves. Piping, valves, gauges, etc., can be mounted in the housing.

---

This invention relates to an apparatus for reacting fluids and, in particular, to obtaining a chemical reaction therebetween.

For purposes of disclosure, this invention is described as being a hydrogenator, especially a small hydrogenator which can be used on the bench of a chemical laboratory.

Heretofore, conventional hydrogenators for chemical laboratory use have consisted of a flask in which the reaction is to take place, and suitable plumbing for supplying hydrogen to the flask. The flask is a closed vessel and shaken during the reaction between the materials within the flask. Danger of explosion exists and especially from the weakening of the plumbing joints during the shaking. The reaction could not be visually observed while taking place.

The objects of this invention are to produce fluid reactors, such as hydrogenators, in which the reaction vessel is transparent so that the reaction can be observed, to produce a reactor in which the materials in the vessel are mechanically stirred, and to produce a reactor which can be safely used on a laboratory bench and in which either small or large quantities of materials can be mixed.

In general, these objects are obtained by constructing a housing in which a transparent reaction vessel is mounted behind a thick window of safety glass or plastic. The fluids in the vessel are stirred by a magnetic bar in the vessel. The hydrogen tank and suitable valves and gauges are mounted in the housing which is small enough to be placed on a laboratory bench. The hydrogenator is comparatively inexpensive, easily used, and permits the ready reaction between many types of fluids for experimental purposes.

The means by which the objects of the invention are obtained are described more fully with reference to the accompanying drawings in which:

FIG. 1 is a front view of the apparatus;
FIG. 2 is a top view of FIG. 1;
FIG. 3 is a cross-sectional view taken on the line 3—3 of FIGS. 2 and 4; and
FIG. 4 is a cross-sectional view taken on the line 4—4 of FIG. 2.

The hydrogenator has a housing 10 having a front wall composed of an upper portion 12, a lower portion 14, with these portions being connected by a horizontal shelf 16. The housing further has a top 18. Mounted on the shelf and in front of the wall portion 12 is the reaction chamber housing portion 20 composed of a front side 22 containing a transparent window 24 composed of safety glass or plastic and which is approximately one-half inch thick. The back side of housing portion 20 has an opening 26 extending through upper portion 12 and into the interior of housing 10. A baffle 28 is joined to the inner side of upper portion 12 and spaced from the opening 26.

Housing chamber 20 has a cover 30 which is removably held in place by bolts 32 and wing nuts 34.

The lower front portion 14 contains several screen covered vents 36.

Hydrogen tank 40 is mounted within housing 10. This tank is supplied from a source of high pressure hydrogen through a pipe 42 containing a valve 44. The knob for operating the valve is shown on the front of upper housing portion 12. A gas pressure gauge 46 is connected to a pipe 42 with the scale showing on the front of upper housing portion 12. Also connected to the tank 40 is a thermometer 48 which shows on the top 18 of the housing. A pipe 50 connects tank 40 through a valve 52 to a flexible tube 54 which ends in the stem part of a detachable coupling 56. Pipe 50 is also branched off by a pipe 58 to a valve 60 connected to a vacuum line 62.

Mounted within reaction chamber housing portion 20 is a transparent reaction bottle 70. This bottle holds a magnetic stirring rod 72, such as disclosed in U.S. Pat. No. 2,951,689, as well as the fluids to be reacted. The top of the bottle is closed by a stopper 74, the upper end of which bears against the cover 30. The stem part of detachable joint 56 is continued into a tube which extends through the stopper 74 into the bottle.

Housing 10 further contains an electric motor M which rotates a permanent bar magnet 76 beneath the bottle 70 and which is controlled by a rheostat indicated by the control knob 78 mounted on the shelf 16. On the same shelf is the electric switch 80 for turning the motor M off and on and a suitably connected indicator light bulb 82. A second electric switch 84 on shelf 16 is connected to a light 86 which is mounted behind opening 26 and for the purpose of illuminating bottle 70 whenever desired.

Electric power is supplied through cable 90 which leads to switches 80 and 84.

In operation, the detachable joint is disconnected by removing the body part of the coupling 56 and pushing it out of the way which can be done by reason of flexible tube 54. The cover is taken off by first removing wing nuts 34 and lifting the cover by handle H. The bottle is then lifted from the housing and the stopper removed for the insertion of whatever desired fluid and usually a suitable catalyst. The bottle is then reinserted into the reaction chamber with the stopper in place, the cover bolted down to bear on the stopper, and the stem part inserted into the body of coupling 56. When in place, the handle H protects the joint from being accidently hit and loosened. Opening of valve 44 permits the pressure fluid, such as hydrogen, to flow into tank 40 where it is held at an operating pressure such as can be observed on pressure gauge 46. At the same time, the temperature of the fluid in tank 40 can be observed on thermometer 48 and the reading used for correcting the pressure. Valve 60 is then opened so that all air or other gases can be withdrawn from the system through vacuum line 62. Valve 60 is then closed and valve 52 opened to permit fluid to flow from tank 40 into bottle 70. Switch 80 is then turned on and rheostat 78 turned to energize motor M. As this motor rotates magnet 76, this magnet pulls magnet 72 within the bottle into rotation and thus produces a stirring which can be such as to produce a deep vortex V as indicated in FIG. 4. The fluids in bottle 70 are thus stirred rather than being shaken and are thoroughly mixed. The mixing can be continued for as long as needed without strain on the plumbing for completing the reaction and during which the changes occurring can be observed through window 24. The mixing is comparatively silent which is an advantage when the apparatus is being used for teaching. The stirring can be illuminated and easily observed by turning on the light 86.

Reactions under pressure, such as catalytic hydrogenations, always involve some hazard of explosion. In this apparatus, any explosion is rendered harmless to the operator because of the protection afforded by the complete enclosure and by the thick window 24 and the fact that the expanding gases can pass through opening 26 and are deflected by baffle 28 into the relative open area containing tank 40 and the plumbing for the apparatus. Any further gas expansion is vented through the screened vents 36 in front of the apparatus as a harmless pressure wave.

The apparatus has the advantage of being adaptable for the mixture of very small quantities of fluids. For example, a test tube containing a stirring magnet and a small amount of fluid can be inserted within the bottle 70, the top of the test tube being open. Consequently, a small amount of fluid in the test tube can be stirred with incoming fluid and produce a reaction of fluids in the order of about 1 cubic centimeter or less. Valve 52 can be closed so that the small amount of gas needed is supplied from what is contained in bottle 70. Such is not feasible with other available types of fluid reactors.

Other advantages are that a thermometer can be placed in bottle 70 and the temperature of the reaction observed through window 24, and that suitable heating or cooling coils can be put around parts of bottle 70. The apparatus is comparatively inexpensive and well adapted for experimental and teaching purposes.

Having now described the means by which the objects of the invention are obtained, I claim:

1. A fluid reactor comprising transparent bottle means for holding a first fluid, a freely movable magnet in said bottle means, magnetic motor means adjacent said bottle means for rotating said magnet, a housing including a chamber enclosing said bottle means, a transparent safety window in said housing chamber for viewing said bottle means, removable cover means on said housing chamber for the introduction and removal of said bottle means, stopper means in said bottle means and held in place by said cover means, and pipe means extending through said stopper means for introducing a second fluid into said housing chamber.

2. A reactor as in claim 1, said pipe means including a pipe joint positioned above said cover.

3. A reactor as in claim 2, further comprising handle means on said cover for protecting said joint means against accidental displacement.

4. A reactor as in claim 3, further comprising an opening in said housing chamber for the relief of excess gas pressures, and baffle means etxending at least partially across said opening for the deflection of a gas pressure wave.

5. A reactor as in claim 4, further comprising vent means in said housing for the relief of gas pressures.

6. A reactor as in claim 5, further comprising light means in said housing for illuminating said bottle.

7. A reactor as in claim 6, said pipe means including flexible tube means extending from said joint means into said housing for displacing a part of a disconnected joint.

References Cited

UNITED STATES PATENTS

| 1,034,400 | 7/1912 | Bunzel | 23—253 XR |
| 2,829,954 | 4/1958 | Dailey et al. | 23—255 |
| 2,951,689 | 9/1960 | Asp et al. | 23—259 XR |
| 3,127,855 | 4/1964 | Conlon | 23—292 XR |
| 3,347,634 | 10/1967 | Brown | 23—253 XR |

FOREIGN PATENTS 147,374   2/1904   Germany.

OTHER REFERENCES

Fisher Scientific Company, Catalog "63," 1962, p. 630.

MORRIS O. WOLK, Primary Examiner

D. G. MILLMAN, Assistant Examiner

U.S. Cl. X.R.

35—18; 23—252, 288; 312—209